US009372108B2

(12) United States Patent
Romanin et al.

(10) Patent No.: US 9,372,108 B2
(45) Date of Patent: Jun. 21, 2016

(54) POWDER FLOW DETECTION (71) Applicant: Nordson Corporation, Westlake, OH (US)

(72) Inventors: Mario Romanin, Valley City, OH (US); James M. Khoury, Strongsville, OH (US); Joseph G. Schroeder, North Royalton, OH (US); Jeffrey A. Perkins, Amherst, OH (US); Terrence M. Fulkerson, Brunswick Hills, OH (US)

(73) Assignee: Nordson Corporation, Westlake, OH (US)

(*) Notice: Subject to any disclaimer, the term of this patent is extended or adjusted under 35 U.S.C. 154(b) by 191 days.

(21) Appl. No.: 14/275,930

(22) Filed: May 13, 2014

(65) Prior Publication Data
US 2014/0245839 A1 Sep. 4, 2014

Related U.S. Application Data (63) Continuation of application No. 13/267,028, filed on Oct. 6, 2011, now Pat. No. 8,767,214.

(51) Int. Cl.
*G01N 21/00* (2006.01)
*G01F 3/38* (2006.01)
(Continued)

(52) U.S. Cl.
CPC ............... *G01F 3/38* (2013.01); *B05B 7/1404* (2013.01); *G01F 1/661* (2013.01); *G01F 1/72* (2013.01); *G01F 1/74* (2013.01); *G01J 1/42* (2013.01)

(58) Field of Classification Search
CPC .............. G01N 21/00; G01F 3/38; G01F 1/72

USPC .................................................. 356/438–442
See application file for complete search history.

(56) References Cited

U.S. PATENT DOCUMENTS 3,845,480 A * 10/1974 Steinberg ............... G01N 21/53
340/627
4,003,255 A    1/1977 Spencer
(Continued)

FOREIGN PATENT DOCUMENTS

CN      1038035 C       12/1989
EP      0338314 A1      10/1989
(Continued)

OTHER PUBLICATIONS

International Search Report for International Application No. PCT/US2012/054555 dated Dec. 20, 2012.
(Continued)

*Primary Examiner* — Roy M Punnoose
(74) *Attorney, Agent, or Firm* — Baker & Hostetler LLP (57) ABSTRACT Apparatus for detecting powder flow along a powder flow path includes a light source and a light detector for detecting light from the light source directed across the powder flow path as powder flows through said powder flow path. A circuit receives the output from the light detector and determines an average or RMS of the signal received by the light detector. The circuit may determine whether there is flow or no flow of powder or whether there is a change in flow rate of powder. Preferably, the apparatus is used in combination with a dense phase powder pump, which causes the powder to flow in pulses from the pump outlet into the powder flow path. More preferably, the light source and detector are enclosed in a housing that is connected between the pump outlet and a powder feed hose which supplies powder to a spray gun or hopper.

50 Claims, 7 Drawing Sheets (51) Int. Cl.
*G01F 1/66* (2006.01)
*G01F 1/72* (2006.01)
*G01F 1/74* (2006.01)
*B05B 7/14* (2006.01)
*G01J 1/42* (2006.01)

(56) References Cited

U.S. PATENT DOCUMENTS

| | | | |
|---|---|---|---|
| 4,519,257 A | 5/1985 | Simpkins | |
| 4,863,316 A | 9/1989 | Gianella et al. | |
| 4,941,778 A * | 7/1990 | Lehmann | B05B 7/1404 250/356.1 |
| 4,999,513 A * | 3/1991 | Ito | G01N 15/147 250/575 |
| 5,454,271 A | 10/1995 | Yamamoto et al. | |
| 5,654,042 A * | 8/1997 | Watanabe | B05B 5/1683 118/627 |
| 5,798,699 A * | 8/1998 | Bryant | G01N 21/534 250/338.1 |
| 5,847,389 A * | 12/1998 | Mertins | G01V 8/16 221/174 |
| 6,093,926 A * | 7/2000 | Mertins | A01C 7/105 250/222.1 |
| 6,322,628 B1 | 11/2001 | Wallace | |
| 6,491,241 B1 | 12/2002 | Sun | |
| 6,776,361 B1 * | 8/2004 | Watanabe | B05B 7/1404 222/195 |
| 7,118,010 B2 | 10/2006 | Crowder et al. | |
| 7,142,298 B2 | 11/2006 | Nuspliger | |
| 7,241,080 B2 * | 7/2007 | Klobucar | B05B 7/1459 406/106 |
| 7,369,230 B1 | 5/2008 | Rogers | |
| 7,782,459 B2 * | 8/2010 | Holve | G01N 15/0205 356/336 |
| 7,997,878 B2 * | 8/2011 | Fulkerson | B05B 7/1459 417/65 |
| 8,057,197 B2 * | 11/2011 | Fulkerson | B05B 7/1459 406/90 |
| 8,101,233 B2 * | 1/2012 | Rodrigues | B05B 7/1472 118/309 |
| 8,167,517 B2 * | 5/2012 | Fulkerson | B05B 7/1454 406/11 |
| 8,459,203 B2 * | 6/2013 | Mauchle | B05B 7/1459 118/695 |
| 2003/0066358 A1 | 4/2003 | King | |
| 2005/0158187 A1 | 7/2005 | Fulkerson et al. | |
| 2007/0007109 A1 | 1/2007 | Powell et al. | |
| 2007/0160769 A1 | 7/2007 | Maev et al. | |
| 2010/0212589 A1 | 8/2010 | Mauchle et al. | |
| 2010/0315638 A1 | 12/2010 | Goohs et al. | |
| 2011/0187850 A1 * | 8/2011 | Barnes | H04N 7/18 348/135 |

FOREIGN PATENT DOCUMENTS

| | | |
|---|---|---|
| EP | 0635702 | 1/1995 |
| GB | 1165313 | 9/1969 |
| JP | 2006-297327 | 11/2006 |
| JP | 2012-78335 | 4/2012 |

OTHER PUBLICATIONS

Written Opinion for International Application No. PCT/US2012/054555 dated Dec. 20, 2012.
Chinese Application No. 201280049435: First Office Action dated Dec. 2, 2015, 13 pages.

* cited by examiner

POWDER FLOW DETECTION

RELATED APPLICATIONS

This application is a continuation of pending U.S. application Ser. No. 13/267,028 filed on Oct. 6, 2011, for POWDER FLOW DETECTION, the entire disclosure of which is fully incorporated herein by reference.

TECHNICAL FIELD OF THE DISCLOSURE

The disclosure relates generally to detecting whether powder coating material is flowing through a tube. More particularly, the disclosure relates to detecting powder coating material flow for flow/no flow conditions and optionally to detect changes in flow rate.

BACKGROUND OF THE DISCLOSURE

Powder coating materials are commonly applied to objects or workpieces using well known spraying technologies. These technologies may include electrostatic and non-electrostatic processes as are well known. Also, some powder coating material application systems deliver powder coating material to a spray gun or other application device in dilute phase, or alternatively in dense phase, as is well known in the art.

SUMMARY OF THE INVENTIONS

In accordance with one aspect of the one or more inventions disclosed herein, a powder coating material flow detection concept uses light energy to detect the presence or absence of powder flow within a tubular member. The intensity of light that is transmitted through the tubular member is related to whether powder coating material is present. In a particular embodiment, a circuit receives a signal related to the intensity of light that passes through the tubular member and determines whether there is powder flow. In a more specific embodiment, a light detector produces an output in response to intensity of light that passes through the tubular member, and a circuit determines an average value of the output. The circuit can then determine whether there is powder flow based on the average signal.

In another aspect of one or more of the inventions disclosed herein, the circuit determines an average value of the light intensity that passes through the tubular member and from that average the circuit determines a characteristic of powder flowing through the tubular member. In one embodiment, the characteristic may be a flow/no flow determination. In an alternative embodiment, the characteristic may be whether flow rate has changed.

In the various embodiments, the average calculation may be an RMS calculation for example, or other calculation as required.

In one embodiment, the light source and detector are enclosed in a housing that is connected to the pump outlet between the pump outlet and a powder feed hose, wherein a powder feed hose supplies powder to a powder hopper or a spray gun.

These and other aspects and advantages of the one or more inventions will be readily understood and appreciated from the following detailed description hereinafter and the accompanying drawings.

DETAILED DESCRIPTION OF THE EXEMPLARY EMBODIMENTS

Although the exemplary embodiments are described herein and presented in the context of specific examples of components and parts and functions, those skilled in the art will readily appreciate that many different types of designs and alternative configurations may be used as needed for a particular application. For example, many different powder pump designs may be used, as well as many different choices of material as well as form, fit and function for the tubular member that is in fluid communication with an outlet of the powder pump and that contains the powder flow. We use the terms "tubular member" and "tube" interchangeably to refer to any conduit or passageway that contains a flow of powder. While the exemplary embodiments refer to common flexible cylindrical tubing, such is not required, and the tube or tubing may take on any suitable geometry and characteristics, and may include any passageway through which powder flows (for example, a block or other structure may be used that has an internal passageway through which powder travels). A feature of interest is that the tube or passageway includes at least a portion that can admit electromagnetic energy through a wall that defines the sensing portion of a passageway or tube. We use the term "sensing function" to refer to an arrangement or structure that detects a characteristic of powder flow. In the exemplary embodiments, the sensing function may be realized in the form of a source and detector of electromagnetic energy. The inventions are not limited to any particular frequency or wavelength of electromagnetic energy, with the only feature of interest being that the selected electromagnetic energy includes one or more wavelengths that can pass through the tube or passageway wall and be detected by a suitable light detection device. We therefore also refer herein to the electromagnetic energy generically as light energy regardless of the selected wavelength or plurality of wavelengths. The tube or passageway wall need not be fully transparent to the selected electromagnetic energy but rather is preferably sufficiently transparent so that light intensity for light that passes through the tube or passageway wall can be related to whether powder is flowing through the passageway or tube and in some embodiments whether the flow rate has changed. The inventions are not restricted to any particular spraying technology, and may be used with corona, tribo-electric and non-electrostatic spraying technologies. The inventions may also be used with many different types of spray guns or other powder coating material application devices, including manual spray guns and automatic spray guns. Many different control systems for the pumps, spray guns and other system components may be used. Except as otherwise may be noted, the size, materials, layout and structural aspects of the various disclosed components are design options. The powder coating material application system may utilize a wide variety of system features including a feed center for supplying powder coating material, spray guns, electronic control systems for the spray booth, spray guns, gun control systems, gun movers, reciprocators, oscillators and so on, overhead conveyor systems, and powder overspray recovery systems.

In the exemplary embodiments, we determine an average value, for example an RMS (Root Mean Square) value, of a time variant analog signal waveform produced by a light detector. We therefore consider the term "average" herein to include, but not be limited to, an RMS calculation. Other mathematical calculations could alternatively be made to represent one or more characteristics of the waveform as needed. For example, the waveform could be digitized and analyzed in the frequency domain. The feature of interest is that the light detector output waveform is analyzed so as to be able to identify changes in the detected light intensity in order to determine whether powder is flowing in the sensing portion of the tubular member, or in another embodiment, identify changes in the detected light intensity to determine whether flow rate has changed. Because the light detector output is a time variant voltage signal in the exemplary embodiment, the use of average value, such as an RMS value for example, is a convenient but not required method to identify such changes in the light intensity. The inventions are also not limited to the use of light detectors that produce an analog voltage output, but other detectors may be used as needed or conveniently available, with appropriate changes in the circuit used for processing the output signal.

The inventions also are not limited to use with any particular type of powder coating material and we therefore herein refer generically to powder which we intend to include any dry particular material, and in specific exemplary embodiments, powder coating material. Moreover, the powder may be used in dilute phase or dense phase and also may be delivered with a continuous flow or pulsed flow.

While various inventive aspects, concepts and features of the inventions may be described and illustrated herein as embodied in combination in the exemplary embodiments, these various aspects, concepts and features may be used in many alternative embodiments, either individually or in various combinations and sub-combinations thereof. Unless expressly excluded herein all such combinations and sub-combinations are intended to be within the scope of the present inventions. Still further, while various alternative embodiments as to the various aspects, concepts and features of the inventions—such as alternative materials, structures, configurations, methods, circuits, devices and components, alternatives as to form, fit and function, and so on—may be described herein, such descriptions are not intended to be a complete or exhaustive list of available alternative embodiments, whether presently known or later developed. Those skilled in the art may readily adopt one or more of the inventive aspects, concepts or features into additional embodiments and uses within the scope of the present inventions even if such embodiments are not expressly disclosed herein. Additionally, even though some features, concepts or aspects of the inventions may be described herein as being a preferred arrangement or method, such description is not intended to suggest that such feature is required or necessary unless expressly so stated. Still further, exemplary or representative values and ranges may be included to assist in understanding the present disclosure, however, such values and ranges are not to be construed in a limiting sense and are intended to be critical values or ranges only if so expressly stated. Moreover, while various aspects, features and concepts may be expressly identified herein as being inventive or forming part of an invention, such identification is not intended to be exclusive, but rather there may be inventive aspects, concepts and features that are fully described herein without being expressly identified as such or as part of a specific invention, the inventions instead being set forth in the appended claims. Descriptions of exemplary methods or processes are not limited to inclusion of all steps as being required in all cases, nor is the order that the steps are presented to be construed as required or necessary unless expressly so stated.

The exemplary embodiments disclose two basic configurations of the inventions and flow detection concepts disclosed herein. Both concepts are based on method and apparatus to detect a characteristic of powder flow along a powder flow path with a sensing function that uses light energy. By "powder flow path" we mean an interior space for flow of powder through a containing structure such that the powder flows from one point to another point. An example of a powder flow path therefore is an interior space of a member through which powder flows, perhaps a hose or tube or any conduit, tubular member, or passageway that contains the powder flow. The powder flow path of interest in the exemplary embodiments is a sensing portion of the powder flow path within a sensing portion of the containing structure or passageway. For example, in the exemplary embodiments herein, the sensing portion may be a portion of the powder flow path through which light energy passes so as to detect flow characteristics of the powder. The flow characteristics may include a no flow condition. Therefore, the light energy may be transmitted into the powder flow path through all or a sensing portion of a wall of the containing structure, or through a sensing portion of an inner space delimited by the wall structure. In the exemplary embodiments herein, light energy may be transmitted through a tube wall of a tubular member to pass into the powder flow path. As used herein, a "portion" of a tubular member refers to the sensing portion unless otherwise noted (for example, reference is also made herein to a flared portion as will be described below). In the first configuration, we describe method and apparatus for detecting a characteristic of powder flow in the form of detecting a flow or no flow condition by sensing light energy. The detected condition, especially a no flow condition, may be used to alert an operator or in some other manner influence the operation of the coating system so as to reduce or eliminate the waste of uncoated or inadequately coated workpieces. In order to make the most of this optional warning, we prefer, although it is not required, to locate the sensing function in close proximity to an outlet of a powder coating material pump.

In the second configuration, we describe method and apparatus for detecting a change in flow rate of powder through a sensing portion of a powder flow path, for example within a tubular member, using light energy. The change in flow rate condition may include detection of a no flow condition, so the two basic concepts are not necessarily mutually exclusive of each other. The second configuration does not necessarily require a determination of the actual flow rate, but rather we look for changes in the flow rate. The second configuration, therefore, may optionally utilize a calibration feature as will be further explained herein. For the second configuration, we also prefer but do not require to locate the sensing function in close proximity to an outlet of a powder coating material pump.

For both concepts and configurations, we provide an optical sensing function by which we use light energy to detect powder flowing through the sensing portion of a tubular member or passageway. In a preferred although not necessarily required embodiment, we use an average or RMS value of a light energy sensor signal to detect powder flow. This average or RMS value allows us to adjust or calibrate for different powder materials that may exhibit different optical properties such as transmittance or reflectance. The use of average or RMS values also allows us to compensate or calibrate for optical properties for different materials that may be used for the sensing portion of the tubular member or passageway.

Figure 1:
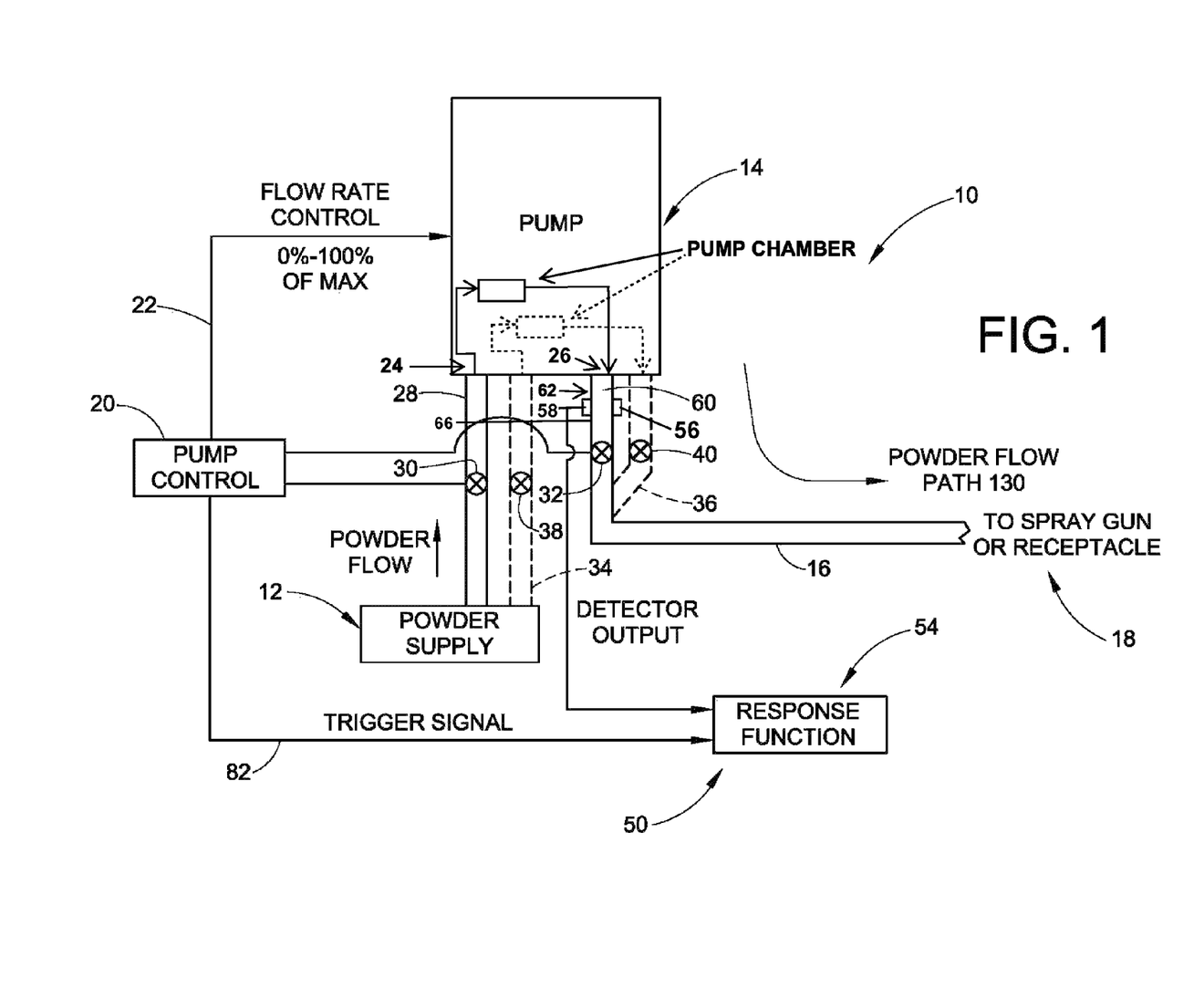
FIG. 1 is a block diagram schematic of a powder coating material application system that uses an embodiment of one or more of the inventions disclosed herein.

FIG. 1 illustrates an embodiment of the concepts of one or more of the present inventions. A powder coating material application system 10 may include a source 12 of powder coating material (hereinafter "powder") such as a box, container, hopper, feed center or other receptacle as is well known in the art. A pump 14 may be used to draw powder from the powder supply 12 and push the powder through a feed hose 16 to an end use 18, for example, a spray gun or, in the case of a bulk transfer pump, or another receptacle.

In the example of FIG. 1, the pump 14 may be realized in the form of a dense phase pump being of the type that pulls powder into a pump chamber using negative pressure and pushes the powder out of the pump chamber under positive pressure. The pump chamber typically is made of a material that is porous to air but not the powder media. Such a pump uses less air in the air powder mixture as compared to a venturi pump for example, and therefore is referred to as a dense phase pump. An example of a dense phase pump is described in published United States Patent Application number 2005/0158187 A1, the entire disclosure of which is fully incorporated herein by reference.

We do not describe in the detail the structure and operation of the pump 14 as it is not necessary for understanding and practicing the present inventions. However, the pump 14 will typically have an associated pump control function or circuit 20 which operates to adjust the powder flow rate control 22 which is the flow rate of powder that is output by the pump, typically stated in pounds per minute, for example. Alternatively, however, some pumps may operate simply in an ON/OFF manner. The flow rate control 22 may be used, for example, to set the output powder flow rate from the pump 14 anywhere from 0% to 100% of the maximum flow rate of the capability of the pump 14.

For a dense phase pump 14, the pump 14 may have an inlet 24 and an outlet 26. The inlet 24 receives powder through a supply hose 28 that is in fluid communication with the powder supply 12. The outlet 26 of the pump 14 is in fluid communication with the feed hose 16. The pump control circuit 20 can control operation of the pump 14 through a series of valves such as a first valve 30 that controls flow of powder into the pump 14 and a second valve 32 that controls flow of powder out of the pump 14. These valves 30, 32 are operated in conjunction with the timing of the application of suction and pressure to the pump chamber (not shown). Accordingly, a dense phase pump 14 produces a powder flow at the outlet 26 in the form of pulses or packets of powder. Additional or second inlet and outlet hoses 34, 36 respectively may be used for a pump 14 design that may include to pump chambers that operate out of phase with respect to each other, meaning that while one of the pump chambers is pulling in powder the other pump chamber is pushing powder out, and vice-versa. The use of multiple chambers can be used to increase flow rate of powder outputted from the pump. Additional control valves such as a third valve 38 in the second inlet hose 34 and a fourth control valve in the second outlet hose 36 may be used by the pump control function 20 to control overall timing of the pump to effect a desired flow rate of powder at the pump outlet 26.

The information presented thus far about the operation of the dense phase pump 14 is well known and explained in much more detail in the incorporated patents, and reference may be made thereto for such explanation. An important note though is that a dense phase pump will produce an output powder flow that can be characterized as pulses or discrete slugs of dense phase powder.

Figures 2, 2A:
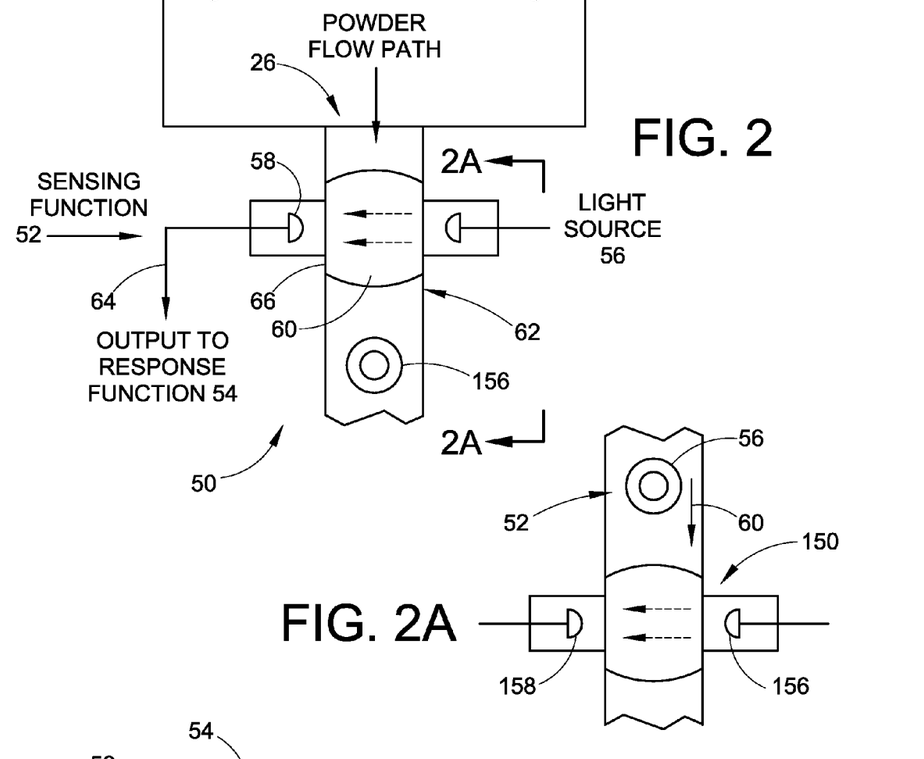
FIG. 2 is an enlarged view of the sensing function embodiment of FIG. 1.
FIG. 2A is an alternative embodiment of the sensing function of FIG. 2 shown in phantom in FIG. 2, shown in side elevation.
Figure 3:
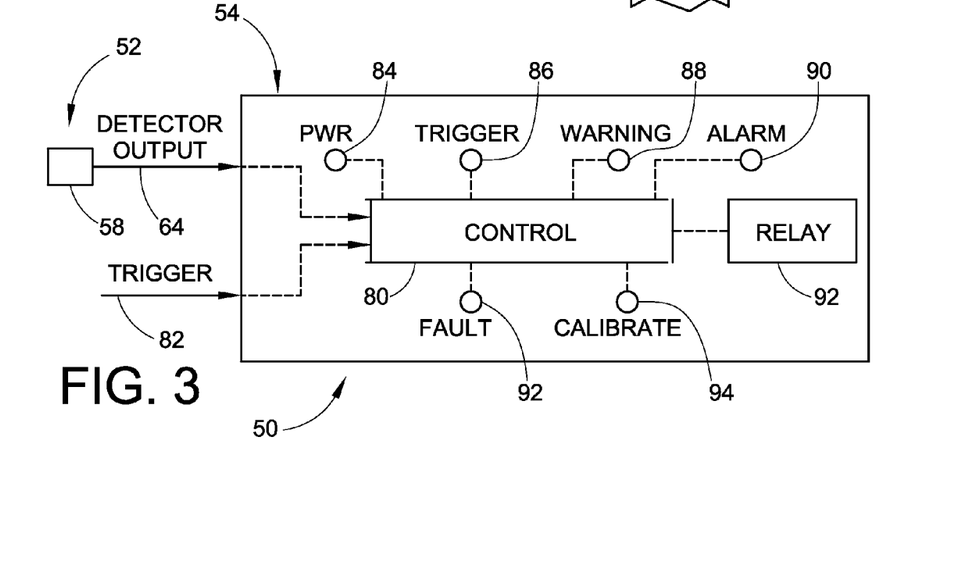
FIG. 3 is an embodiment of a response function of FIG. 1.

With the above description of the pump 14 as the background for use of the inventive concepts herein, we also now refer to FIGS. 2 and 3 for description of an exemplary embodiment of an apparatus for detecting powder flow. By detecting whether powder is flowing in a passageway, such as for example a passageway in communication with the end use 18, we can generate a warning or other alarm when the flow is unexpectedly interrupted, or alternatively when the flow rate changes. This notification or alarm can then be used to inform an operator that the coating process may not be correct, allowing the operator to take corrective action if needed to minimize waste.

An apparatus 50 for detecting flow of powder in a passageway, such as the tube 16 for example, may include in a basic form, a sensing function 52 and a response function 54. In practice, the sensing function 52 alone can produce an output signal that indicates or contains the information of whether powder is flowing. This output signal could simply be displayed on a scope without any signal processing for example and an operator could visually see the signal indicating powder flow or no flow. Or alternatively the output signal could directly drive a lamp or other indication device to the operator as to the state of the output signal. In such a case, the scope or the indication device could serve as the response function 54. However, the raw data out from the sensing function in many cases will not be adequate to determine whether there is powder flow because there is no reference for comparison. But in our exemplary embodiment, we may use the response function 54 to perform an analysis of the sensing function 52 output signal in order to further refine its utility in indicating whether there is a flow or no flow condition or alternatively whether flow rate has changed. In our exemplary embodiment, the response function 54 may be realized in the form of a circuit (described below) that includes a signal processing capability such as a microprocessor that receives the analog output from the light detector 58 and determines an average or RMS value of that signal over time.

In the exemplary embodiment of FIGS. 1-3 then, the sensing function 52 uses optical properties of electromagnetic energy, herein referred to as light energy, to detect powder flow in a passageway. Because the pump outlet 26 is connected to the feed hose 16 that feeds the spray gun or other end use, we find it desirable although not necessarily required to sense powder flow in the hose 16 in close proximity to the pump outlet 26.

The sensing function 52 (see FIG. 2) may be realized in the form of a light source 56 and a light detector 58. The light source 56 and light detector 58 may be disposed as to be diametrically facing each other on opposite sides of the feed hose 16 to provide line of sight detection. This assures that the light energy passes through the center of the feed hose 16 where most of the powder can be expected to flow. Because the inventions have use in many different applications, from here on we will refer to the hose 16 as providing a powder flow path 60, such as passageway 60, through which powder flows, particularly a passageway 60 provided by a tube or tubular member 62 (for example, the feed hose 16) keeping in mind that our use of the term tube or tubular member is not limited to just flexible cylindrical members but can be any structure that provides a passageway for the flow of powder, even a bore in a block for example.

The basic concepts utilize the idea that when there is no powder in the passageway 60, then a maximum intensity of light from the light source 56 that travels through the passageway 60 via the tube 62 wall will reach the light detector 58. The light detector 58 will generate a detector output 64 that is related to the intensity of the light that is detected. The intensity of light that reaches the light detector 58 will depend on the intensity of the light that is produced by the light source 56, the transparency of the tubular member 62 and the efficiency of the light detector 58 in converting the detected light intensity into an output signal, for example, voltage or current. The transparency characteristic of the tube wall may be selected based on the wavelength of light that is generated by the light source 56. An exemplary light source 56 is a red light emitting diode, for example, part no. WP7104SRC/D available from Kingbright, and a suitable light detector 58 is a light to voltage converter such as a TSL12S available from Texas Advanced Optoelectronic Solutions, Inc. Many alternative light sources and light detectors may be used. The light source 56 and light detector 58 will be selected for compatibility and also with the transparency of the tubular member 62. The example light detector 58 produces nearly a 5 volt DC output 64 at maximum intensity.

When powder is present in the tubular member 62 the powder will reflect, scatter, or absorb light energy or otherwise reduce the intensity of the light that passes through to the light detector 58. Accordingly, the output signal 64 from the light detector 58 will change, in this case the voltage will decrease. If all the light is blocked then the light detector output 64 will be near zero volts.

With a dense phase pump 14 as noted, the powder that flows from the outlet 26 is pulsed. This will cause the light detector 58 to produce an output signal that is also pulsed. Typically we do not see the detector output go to near zero when a powder pulse passes between the light source 56 and the light detector 58, but such could happen.

Because we are detecting powder flow through a tubular member 62, we prefer although it is not required in all cases, for the tubular member 62 to be generally vertically oriented so that gravity can assist the powder to clear the tube.

Not all feed hoses 16 or other tubular members providing the powder flow passageway 60 are sufficiently transparent to light energy. Therefore, we contemplate that in some cases it will be desirable to provide a section or portion 66 of tube to provide the needed transparency for the light energy. This portion 66 may be a piece of tube that is inserted in line with the feed hose 16 for example, again preferably in a location that is proximate the pump outlet 26. How the portion 66 is inserted into the passageway so as to provide a portion of the passageway 60 is a matter of design choice, and we present one embodiment in FIGS. 5-7 herein. For example, a suitably transparent portion may be spliced into the main hose 16. In any case, the portion 66 of the tubular member 62 through which light energy is transmitted, whether it is a continuous tube or an added piece, serves as the sensing portion 66 of the tubular member or passageway 60 for detecting flow of powder therein. Preferably, the length to width ratio of the sensing portion 66 should be great enough so that if there are any boundary layers where the sensing portion 66 is installed, that the boundary layer will not retain powder within the path for the light energy to travel from the light source 56 to the light detector 58.

Figure 4A:
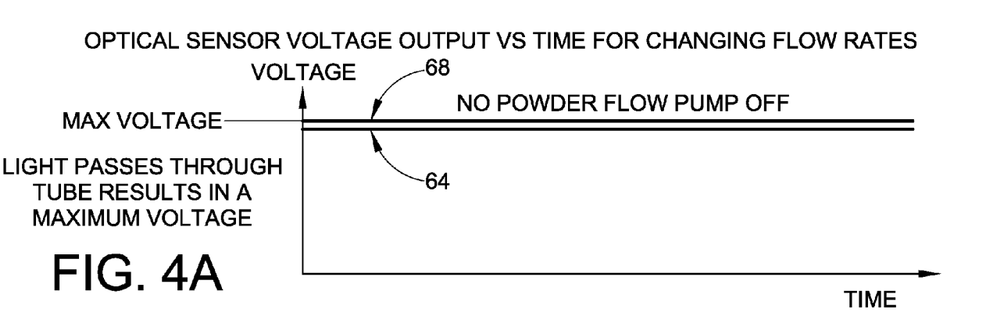
FIGS. 4A-4E illustrate an exemplary output signal from a light detector for different powder flow conditions, with the single waveform shown in a simplified manner for ease of understanding.

FIG. 4A shows in a simplified manner the output voltage from the light detector 58 versus time. FIG. 4A relates to a condition of no powder flow, so that the light detector output 64 is a maximum voltage that is about the maximum voltage output 68 available from the detector 58. The actual maximum output 64 for detected light energy will typically be slightly less than the maximum output available from the light detector 58 because of some attenuation, deflection or diffraction of some of the light intensity as the light energy passes through the wall material of the tubular member 62. The maximum voltage out 64 also is a function of how well the light source 56 is outputting light intensity. The signal 64 is basically a steady state value because the light remains uninterrupted. For all of the FIGS. 4A-4E we use simplified representations of the output signal from the light detector 58 for clarity and ease of understanding. In practice, the analog output of the light detector 58 will be a more jagged trace as the instantaneous output signal will fluctuate with the transmittance of the powder. So we smooth out or stylize the waveform in order to more clearly set forth the operational principles.

Figure 4B:
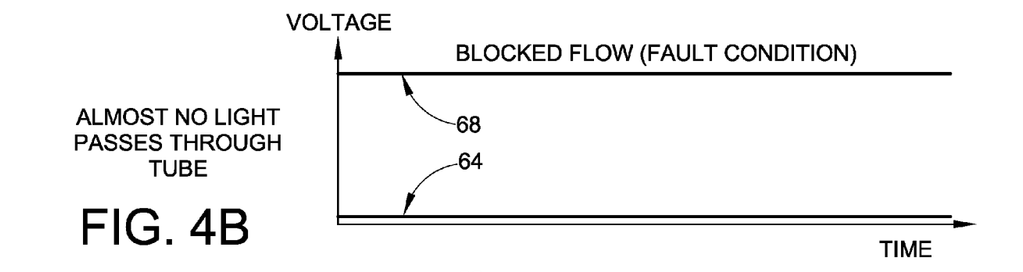

FIG. 4B illustrates the output voltage from the light detector 58 for the condition where there is a slug of powder between the light source 56 and the light detector 58, or simply the sensing portion 66 of the tube 62 is basically filled with powder. In this condition, the powder basically blocks most of the light energy from passing through the sensing portion 66 of the tube and the light detector output 64 is near zero volts.

Now, as a practical matter, during normal use the powder will not simply sit in the sensing portion 66 and block all light to the light detector 58. Rather, for a dense phase pump, the powder pulses will result in an average intensity of detected light over time for a given flow rate of powder from the pump 14. Therefore, we can use the light detector output signal 64 to indicate a flow or no flow condition by determining an average value of the output signal 64 and verifying that is falls somewhere in between the two extremes of FIGS. 4A and 4B. For the exemplary embodiment of FIGS. 4C-4E we use RMS as the average calculation.

Figure 4C:
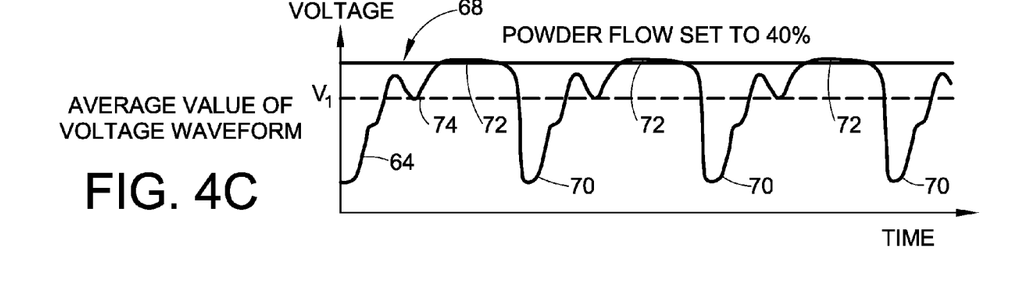

For example, FIG. 4C illustrates an example for a dense phase pump 14 that is set to a flow rate of about 40% of the maximum output flow rate for the pump 14. Each slug of powder causes a reduction in the intensity of the light that reaches the light detector 58, resulting in the pulsed output nature of the light detector signal 64. Each slug of powder blocks some of the light energy from reaching the light detector 58 and so the detector output 64 voltage drops as at 70. A repeating series of these drops occurs at intervals that correspond with the pulses of powder that are pushed out of the outlet 26 of the pump 14. Thus, the valleys 70 represent the maximum drop in light intensity when the powder slug passes between the light source 56 and the light detector 58. As each slug clears through the sensing portion 66, then the voltage output from the light detector 58 returns near its maximum as at 72. The waveform 64 is not a perfect square or rectangle because the slugs of powder do not typically have sharp leading and trailing edges.

Because the waveform produced by the light detector output 64 is analog, we can easily calculate the RMS value (V1) of that signal over time as indicated by the line 74. This value 74 will be generally steady so long as the amount of powder in each slug remains generally constant which is typical for a dense phase pump. Note than the RMS value of the output signal 64 from the light detector 58 directly corresponds to the RMS value of the intensity of light energy that reaches the light detector 58. When powder is being pumped and flowing through the sensing portion 66 of the tube 62, the RMS value calculation will indicate that powder is flowing because this value will fall between the extremes of FIGS. 4A and 4B.

For either style pump, dense phase or dilute phase, if the output signal 64 goes to one of the extremes, then the output signal 64 is indicating either a no flow condition (such that the average value would be near the maximum voltage output as in FIG. 4A corresponding to no powder passing through the sensing portion 66); or alternatively another problem such as the hose 16 is obstructed or constricted so that powder is trapped in the sensing portion 66 (such that the average value would be near zero as in FIG. 4B). If the RMS value changes dramatically from the initial value, even if not to one of the extremes, then this also indicates a potential problem with the pump or the powder flow path. What percentage deviation is used to indicate such a possible situation is a matter of design choice.

Figures 4D, 4E:
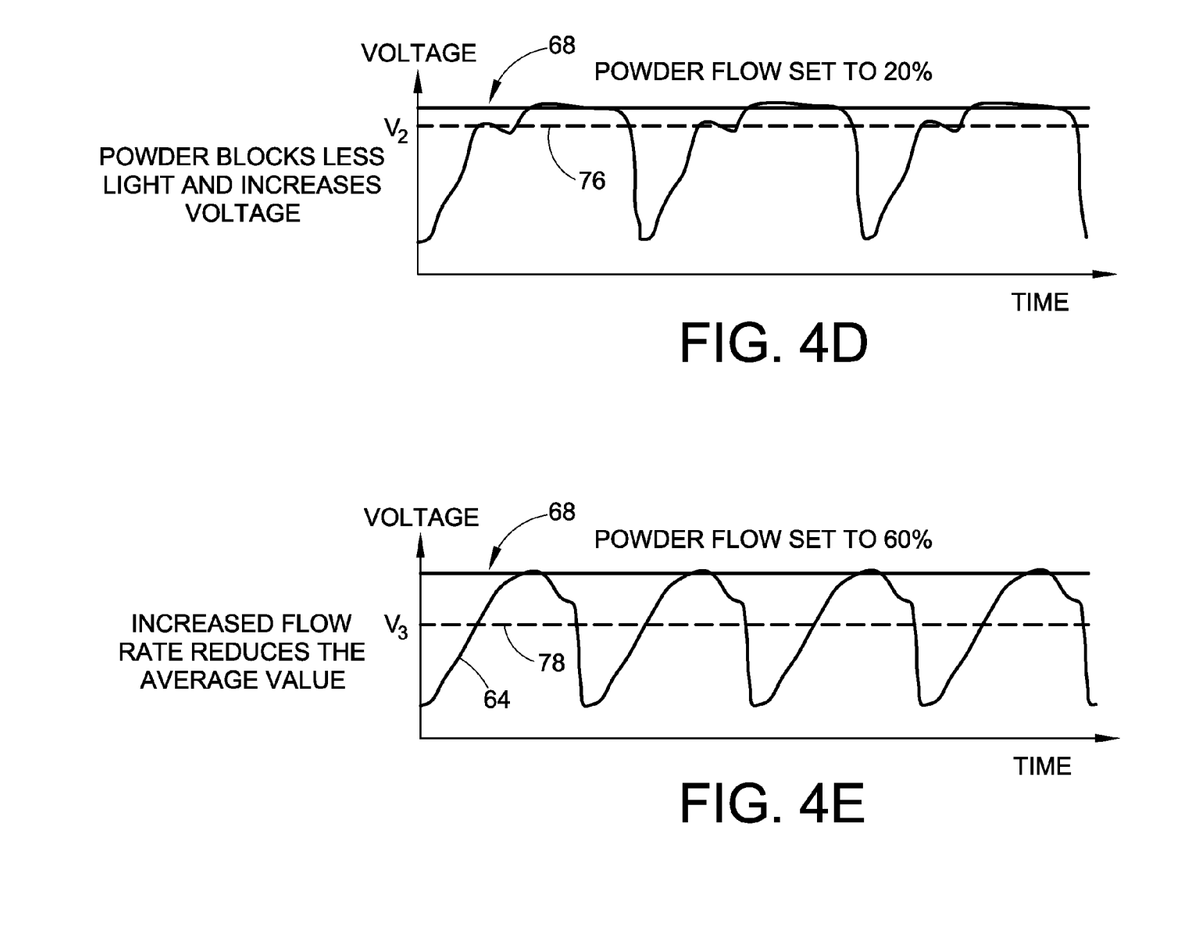

The preceding description explains an example of the first configuration to determine or detect flow/no flow conditions. As we previously noted hereinabove, the second configuration allows us to determine whether the powder flow rate has changed during use of the pump 14. We accomplish this alternative embodiment, in one example, by including a calibrate mode for the response function 54 by which we first determine an expected average or RMS value for the output signal 64 from the light detector 58 for each flow rate setting of interest. These expected or calibration values may then be used to determine if the actual flow rate has changed from the desired or programmed flow rate that is set by the pump control 20 and the flow rate control 22 (FIG. 1). FIGS. 4C and 4D illustrate an example of how this can be done.

Recall that FIG. 4C illustrates the RMS value 74 (V1) for a dense phase pump 14 when the pump is set to 40% of the maximum flow rate. The average value 74 can then be stored as a calibrate value. Suppose now that the flow rate changes during a coating operation from 40% to 20% as represented in FIG. 4D. FIG. 4D illustrates that at 20% flow rate the RMS voltage output V2 (shown by the time based line 76) from the light detector 58 increases owing to the fact that there is less powder flowing through the sensing portion 66 of the tube. Thus, V2>V1. The response function 54 may be programmed so as to detect when the RMS flow rate changes more than, for example, a percentage deviation from the desired flow rate by calculating when the actual flow rate represented by the RMS output voltage V2 of the light detector 58 has changed (either higher or lower) from the calibrated value V1 by a predetermined amount or percent. How far the deviation is allowed to go before an alert or warning is issued is a matter of design preference.

FIG. 4E illustrates in the exemplary embodiment that when the flow rate increases, say to 60% of maximum flow, the RMS value output voltage V3 (shown by line 78) from the light detector 58 will decrease because more powder on average is flowing through the sensing portion 66 of the tube. Thus V3<V2 and V3<V1 and V2>V1. Stated another way, V2>V1>V3 for flow rates of 20%, 40% and 60% respectively.

The change in flow rate may be useful, for example, to detect whether an operator has changed the flow rate setting of the pump from what it should be for a particular coating recipe, or if the pump operation somehow has changed the flow rate.

How the calibrate function is carried out is a matter of design choice and convenience. Different calibrate values may be stored for each selectable flow rate of the pump, or alternatively the expected or calibrate value may be determined by simply running the pump 14 at the programmed flow rate and storing the detected average or RMS value of the detector output 64. This approach however may leave the determination susceptible to changes over time of the intensity of the light generated by the light source 56, the sensitivity of the light detector 58, or the transparency of the sensing portion 66 of the tube. Thus, the calibrate mode preferably will be carried out when the system components are known to be accurate.

The calibrate mode may be run independent of knowing the actual flow rate produced by the pump 14. For example, suppose we want to calibrate the sensing function 52 for the pump 14 at 40% flow rate. We can set the flow rate at 40% and then store the average or RMS value of the light detector output 64 as corresponding to whatever the actual powder flow rate from the pump 14 is, whether it is precisely 40% or not we will be able to detect when that flow rate changes. Therefore, we are not in practice measuring an actual flow rate, but rather analyzing whether the flow rate has changed.

The calibrate mode is also important because different powder materials may and typically will have different optical properties such as absorption, reflectance, translucence and so on. With reference to FIG. 4C again, the reference value V1 may indeed change based on the type of material that is being pumped. Therefore, running a calibrate mode may be very useful in order to determine the average intensity of light transmitted through the sensing portion 66 at a selected flow rate. Alternatively, the system may be calibrated in advance for a variety of materials and flow rates and the average values stored in memory to be accessed as the calibration value. Many other ways will be apparent to utilize the calibration feature. The calibrate mode therefore may be useful for both the flow/no flow configuration or the flow rate configuration because even for the flow/no flow configuration the average value of the detected light intensity may vary based on the powder material.

Those skilled in the art will readily appreciate that the flow/no flow or first configuration may be used as a special case of the second configuration. For example, if the pump 14 is set at 40% and we have a calibrated RMS value of the light detector 58 output 64 as V1, then if the RMS value of the light detector output 64 is noted to approach the maximum value 68 then we have a no flow or low flow condition. The no flow condition may be ascertained different ways, for example, by detecting when the average or RMS value increases a predetermined percentage above the calibrated value V1, or if the average or RMS value comes within a predetermined percentage of the maximum value 68. Many other options are available to the designer to thus determine low flow and no flow conditions.

FIG. 3 illustrates an embodiment of the response function 54. In this example, the response function 54 may be realized with a control circuit 80, such as for example, a digital processor such as, for example, a microprocessor 80. A suitable microprocessor is model PIC 16F887 available from Microchip. The control circuit 80 receives as an input the light detector 58 output signal 64. The control circuit 80 must also know when to monitor the light detector output signal 64 so as not to create a false alarm when the pump 14 is not operational. Therefore, the control circuit 80 also may receive a trigger signal 82 as an input from the pump control 20. The control circuit 80 can easily and quickly calculate the average or RMS values of the light detector 58 output signal over the time sampling rate is desired. The control circuit 80 may light a POWER (PWR) lamp 84 to indicate that system powder to the control circuit 80 is on, as well as light a TRIGGER lamp 86 to indicate that the pump 14 is active and that the control circuit 80 is monitoring the light detector output signal 64.

In the first configuration, if the control circuit 80 detects a no flow condition the control circuit 80 may light a WARNING lamp 88 or activate an audible warning for example. If the no flow condition persists the control circuit 80 may light an ALARM lamp 90.

In the second configuration, the control circuit 80 may light the WARNING lamp 88 if the flow rate changes by a predetermined amount, and then light the ALARM lamp 90 if the flow rate changes even more or if a no flow condition is detected. These are but a few examples of the many options available as to what to do in response to a detected anomaly such as with a no flow condition or a change in flow rate. Still further, the control circuit 80 might actuate a relay 92. Change in the relay 92 state may be used to indicate to another control system, such as for example the control system for the coating line, that there is a fault in the powder flow so that the coating system could either be shutdown or at least analyzed to determine if work pieces are being coated incorrectly.

Although we use average or RMS values to analyze the light detector output signal 64, such is not required. Many other analytical processes may be used either on the real time analog output signal from the light detector 58 or alternatively a digitized version thereof. As noted before, the light detector 58 output contains the information whether there is a no flow condition or alternatively a flow rate change condition. The signal processing may be selected as a matter of design preference as to how to extract that information and in what form to use it or present it to an operator.

Figure 5:
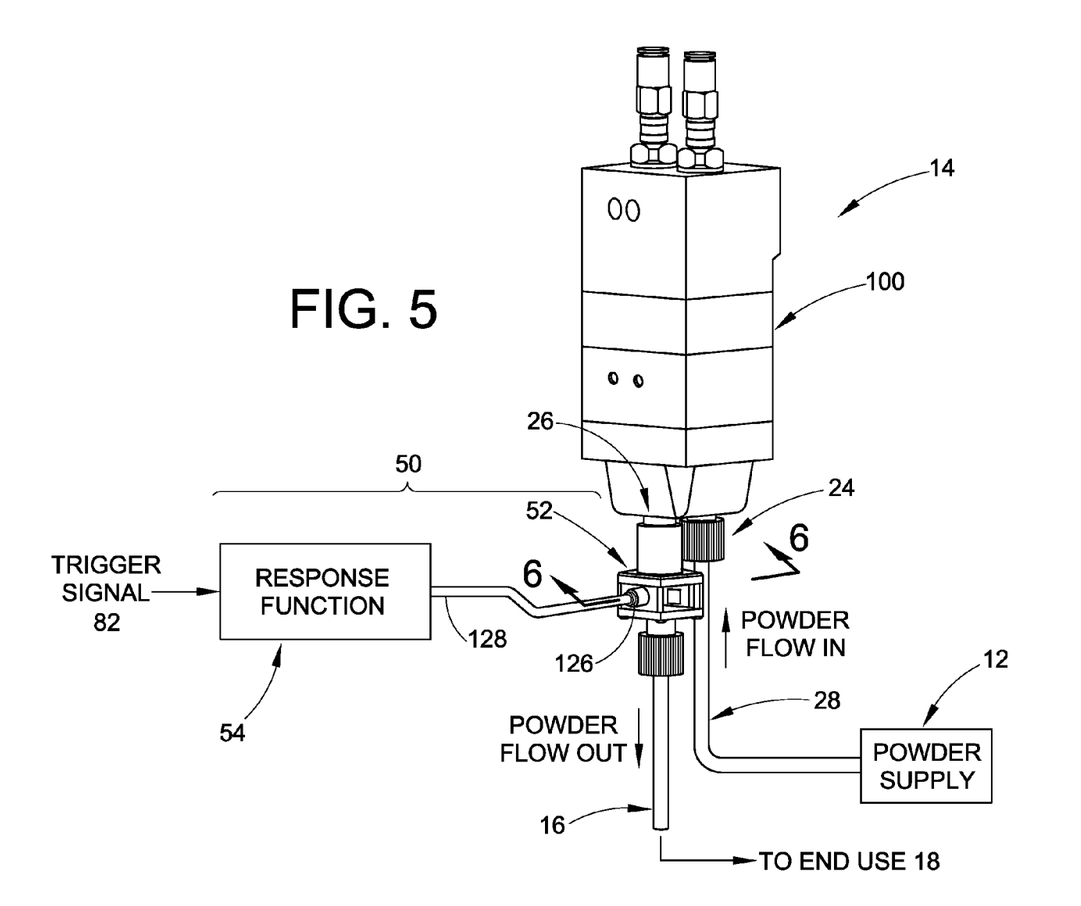
FIG. 5 is an elevation of a dense phase pump with an embodiment of one or more of the inventions disclosed herein.
Figure 6:
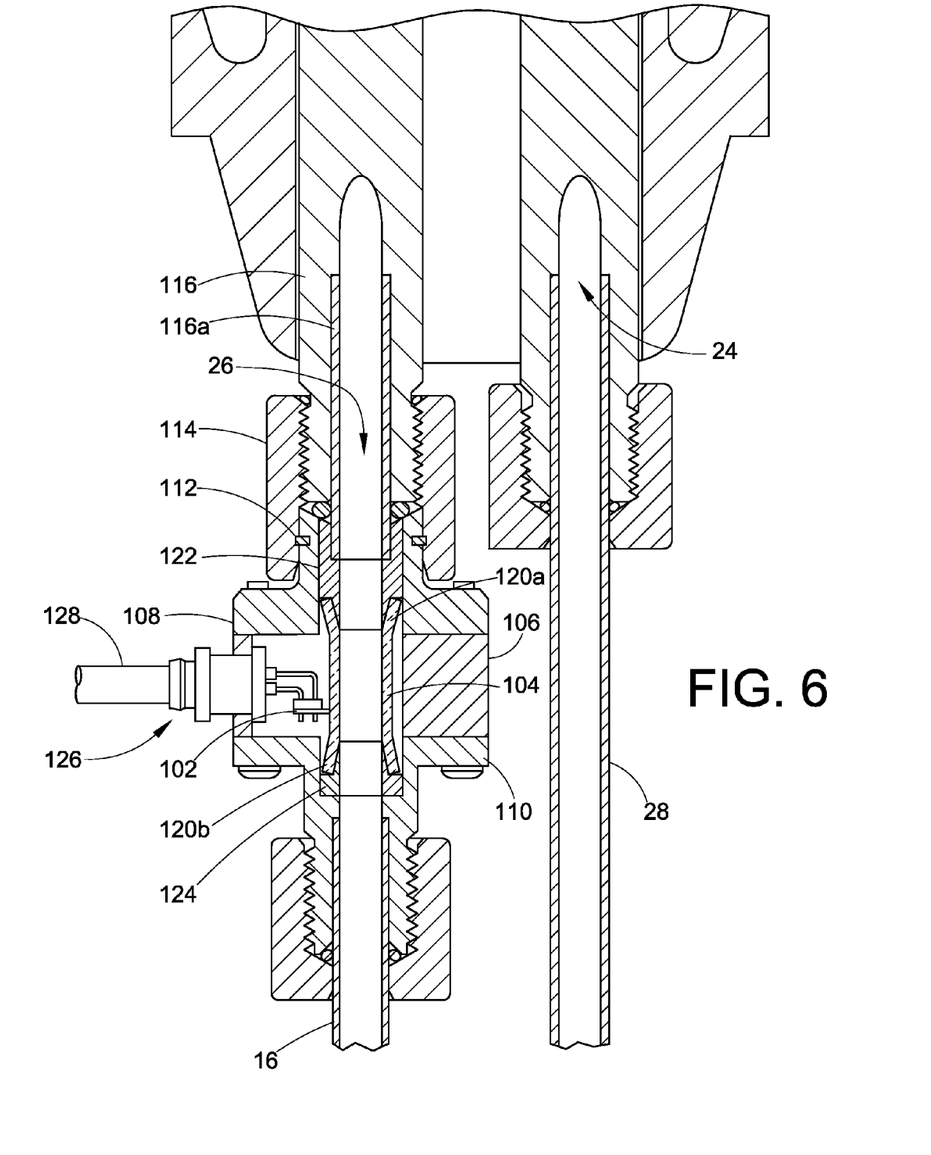
FIG. 6 is a longitudinal cross-section of FIG. 5 taken on the line 6-6 of FIG. 5.
Figure 7:
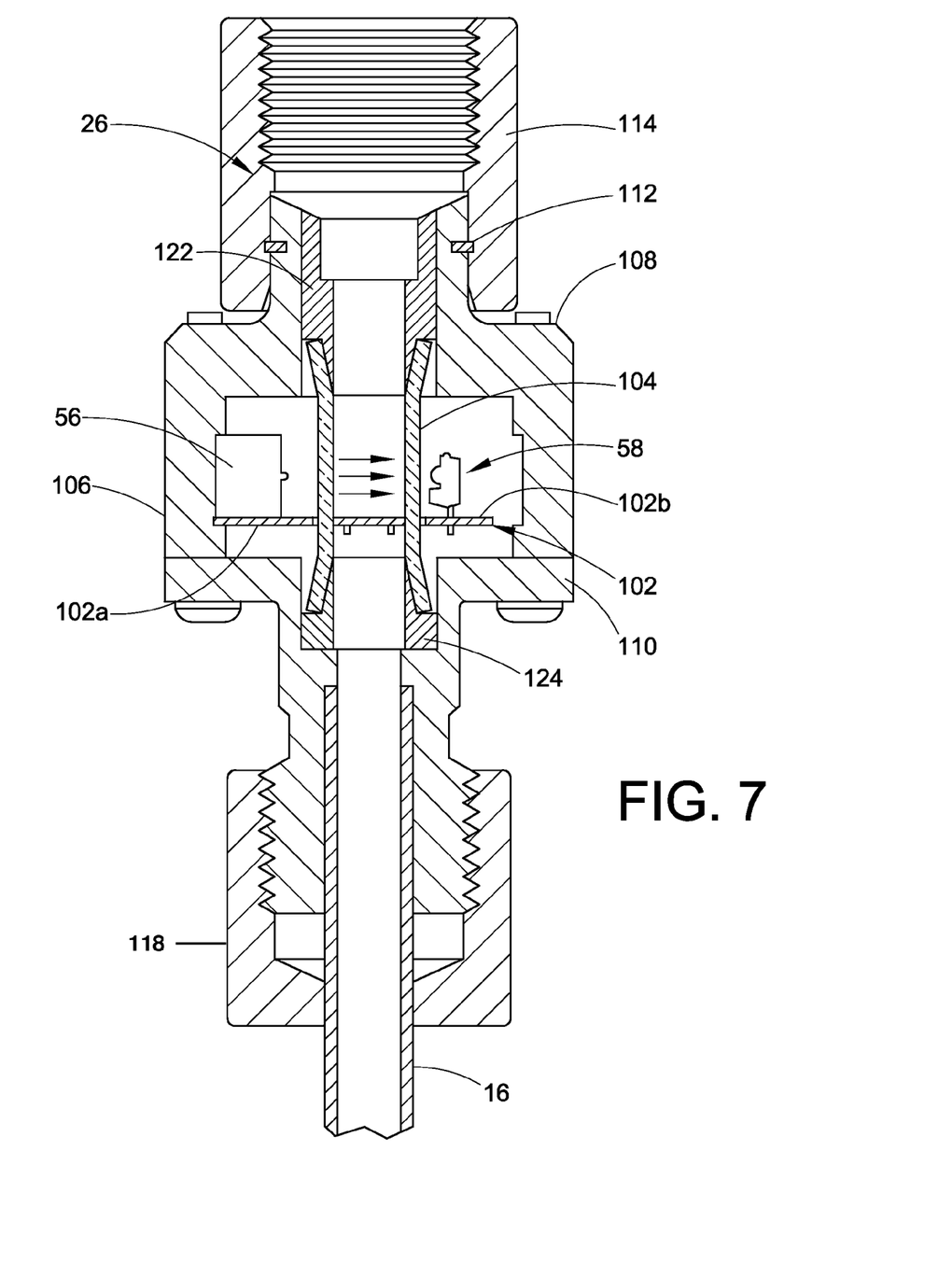
FIG. 7 is the longitudinal cross-section of FIG. 6 rotate 90 degrees.

FIGS. 5-7 illustrate an embodiment of one or more of the present inventions used in an exemplary manner with an exemplary dense phase pump 14. Preferably, the sensing function 52 is disposed near or proximate the outlet 26 of the pump 14. In this embodiment, the pump 14 may be an HDLV pump available from Nordson Corporation, Westlake, Ohio. This pump 14 produces pulses or slugs of powder flow through the outlet 26. Powder coating material is drawn into the pump 14 via the supply hose 28 that is in fluid communication with a supply 12 of the powder coating material. The outlet 26 usually is connected directly with the feed hose 16, but in this embodiment of the inventions, we install the sensing function 52 in line with the feed hose 16. Thus, is this exemplary form, an apparatus for detecting powder flow in a tube or passageway includes the sensing function 52 and the response function 54. The response function 54 may be realized in the form described herein with respect to FIG. 3 or may take on a different embodiment. The sensing function 52 may be realized in the form described herein with respect to FIG. 2 or may take on a different embodiment. Note that the control valves 30, 32, 38 and 40 of FIG. 1 along with the flow rate control 22 are incorporated into the pump 14.

The pump 14 may include a main housing 100 that encloses a series of air port controls, valves, pump chambers and fluid passageways that comprise the pump 14. The pump 14 may operate in accordance with the patents noted hereinabove or may be a different design.

The sensing function 52 may be mechanically coupled to the pump 14 in any number of ways. In the embodiment herein, the sensing function 52, which basically includes the light source 56 and the light detector 58 (FIG. 7), is disposed on a circuit board or substrate 102. The circuit board 102 may be U-shaped with the light source 56 on one leg 102a of the U and the light detector 58 on the opposite leg 102b of the U and facing each other as in FIG. 7. The recess formed by the U shape receives a tubular member 104 such that the light source 56 and light detector 58 are preferably aligned diametrically opposite each other on opposite sides of the tubular member 104. The tubular member 104 is preferably transparent to the wavelength(s) of the light energy that is transmitted from the light source 56 to be detected by the light detector 58, at least in the region that light energy will pass through the tubular member between the light source and light detector. Therefore, the portion 104 through which light energy is transmitted corresponds to the sensing portion 66 noted in the discussion of FIGS. 1 and 2. The circuit board 102 is mounted in a housing 106. The housing 106 is illustrated (see FIG. 5) as transparent for convenience of illustration, but need not be transparent in practice. Portions of the housing 106 may be transparent as needed without making the entire housing transparent.

First and second connectors 108, 110 may be used to mount the housing 106 near the outlet 26 of the pump 14. The upper or first connector 108 comprises an upper portion of the housing 106 and may be coupled as with a snap ring 112 to a first threaded nut 114 that mates with a threaded outlet member 116 that may include a connector tube piece 116a from the pump 14 (note in FIG. 7 the outlet member 116 is omitted). This allows the entire sensing function 52 assembly to be installed with and removed from the pump 14 in a conveniently modular fashion. Thus, the sensing function 52 may be an add-on feature for a pump 14 already in the field. When the upper connector 108 is joined to the outlet 26 of the pump 14, the outlet 26 is in fluid communication with the tubular member 104 and powder will flow through the tubular member 104 out to the feed hose 16. Note that the tubular member 104 is preferably mounted with a vertical orientation and is sufficiently vertical so that gravity may assist in clearing powder through the tubular member 104.

The lower or second connector 110 comprises a lower portion of the housing 106 and may be used to join the feed hose 16 to the base 106 so that the feed hose 16 is in fluid communication with the tubular member 104. This may be done, for example, with a second threaded nut 118 that mates to a threaded end of the second connector 110.

An electrical connector 126 may be used to couple a signal cable 128 (FIG. 5) to the sensing function 52 so as to provide power to the light source 56 and to receive the output from the light detector 58. The signal cable 128 is connected at its second end to the response function 54 so as to provide the light detector 58 output to the control circuit 80 (FIG. 1).

It will be noted that we preferably outwardly flare the tubular member 104 at either end 120a, 120b. First and second joint members 122, 124 are respectively used on each end of the tubular member 104 to form a fluid communication between the pump outlet 26 and the tubular member 104 and the tubular member 104 to the feed hose 16. The flared entry and exit ends of the tubular member 104 help assure that there are no entrapment areas where the light energy is being transmitted into the tubular member, such that could retain powder which might interfere with interpreting the signal from the light detector 58.

Therefore, the tubular member 104 that comprises the sensing portion 66 may form part of the powder flow path 130 (FIG. 1) from the pump outlet 26 to the end use 18 so that the sensing function 52 can be used to detect a flow/no flow condition or alternatively a flow rate change condition. The tubular member 104 thus provides a sensing portion 66 of a tube or passageway along the powder flow path 130 through which powder flow is to be detected. But those skilled in the art will appreciate that if the feed hose 16 is sufficiently transparent in the range of wavelengths used for the light source 56 and light detector 58, then the sensing function 52 could be mounted directly about the feed hose 16 and the feed hose itself present the sensing portion 66. Regardless of where the sensing function 52 is disposed, the light source 56 and light detector 58 will operate with light energy that is directed into the sensing portion of a passageway or tubular member, with the intensity of the light energy that passes through to the light detector 58 being a function of whether powder is flowing through the sensing portion.

Although the exemplary embodiments herein utilize a single light source and light detector as the sensing function 52, those skilled in the art will readily appreciate that additional pairs of sensors may be used. The use of additional pairs may improve overall accuracy of the sensing function. For example, a dense phase powder flow pattern within the feed hose 16 or other portion of the powder flow path 130 may form or flow in a rope like pattern that can swirl. This can result in the sensing portion of the powder flow path not being filled with powder even under normal operating conditions. FIGS. 2 and 2A illustrate an embodiment of using two pairs of sensors for the sensing function 52, although even more pairs may be used as needed. The second pair 150 is illustrated in FIG. 2 in phantom as it is optional. In this embodiment, the second pair 156 (including source 156 and detector 158) may be rotationally offset from the first pair 56, 58. In this example the rotational offset may be ninety degrees. If additional pairs are alternatively used, they may also be spaced rotationally about the sensing portion of the powder flow path as needed. By using additional light source/detector pairs, for example the additional pair 150 positioned ninety degrees rotationally from the first pair 56, 58 we can increase the opportunity to detect the powder flow. Even more light source/detector pairs may be used, for example, evenly (or unevenly as may be needed) spaced in a radial manner about the sensing portion 104. Whether the detected intensity for each light source/detector pair is analyzed separately or processed in combination is a matter of design choice. Furthermore, the one or more additional sensing functions 52 may be located elsewhere along the powder flow path 130 as needed. For example, the second pair 150 is illustrated as not only rotationally offset from the first pair 52, but also axially offset or spaced from the first pair. However, the pairs may also be positioned to sense flow through the same sensing portion of the powder flow path if required.

In addition to the various apparatus for detecting flow rate of powder coating material in a tube presented herein, our inventions also include related methods of use of the apparatus, as well as a method for detecting powder flow rate. In an exemplary method, light energy is directed into a portion of a passageway for powder flow, intensity of light energy that passes through the passageway is detected, and a determination of whether powder is flowing in the passageway is made based on the detected intensity. In one embodiment, the method includes determining an average or RMS value of the intensity of the light energy that passes through the passageway. In another embodiment, the detected intensity of the light energy, for example the average or RMS value, is compared to a calibrated value to determine if the powder flow rate has changed.

We thus provide method and apparatus for detecting or verifying the presence or transport of airborne solid particles in a passageway or tube. We accomplish this detection in a manner without introducing a disturbance in the powder flow, or in other words with a non-invasive technique. For example, we accomplish the detection without changing the fluid passage cross-sectional area, without introducing additional air flow, without creating a pressure change or without creating an interruption or change in flow direction. The powder flow path from the pump outlet to the end use is thus not changed as to the operational aspects including pressure, flow rate or direction, temperature and so on.

It is intended that the inventions not be limited to the particular embodiments disclosed for carrying out the inventions, but that the inventions will include all embodiments falling within the scope of the appended claims.

We claim:

1. An apparatus for detecting pulsed powder flow in a tube, the apparatus comprising:
   a powder pump comprising a pump chamber, wherein powder is drawn into said pump chamber by negative pressure applied to said pump chamber and powder is pushed out of said pump chamber to a pump outlet when positive pressure is applied to said pump chamber so that powder will flow in pulses from said pump chamber into a powder flow path during operation of said powder pump,
   a sensor along the powder flow path, wherein the sensor produces an output signal that is related to a flow characteristic of powder from said pump chamber into said powder flow path,
   a circuit in electrical communication with the sensor, wherein the circuit receives said output signal and determines, based on said output signal, whether powder is flowing through said powder flow path, and
   a first valve and a second valve in fluid communication with the powder pump,
   said first valve controlling flow of powder into said pump chamber and said second valve controlling the flow of powder out of said pump chamber.

2. The apparatus of claim 1 wherein said powder pump comprises two pump chambers that alternately supply powder to said powder flow path.

3. The apparatus of claim 1 wherein said powder pump further comprises a controller that includes said circuit.

4. The apparatus of claim 1 wherein said output signal is pulsed and said circuit that receives said output signal from said sensor determines an average of said output signal.

5. The apparatus of claim 1 wherein said sensor comprises a light source and a light detector, and said light source and said light detector are disposed on diametrically opposite sides of a portion of said powder flow path.

6. The apparatus of claim 5 wherein said portion of said powder flow path is light transparent.

7. The apparatus of claim 5 wherein said portion of said powder flow path is transparent to wavelengths of light produced by said light source and that can be detected by said light detector.

8. The apparatus of claim 5 wherein said portion of said powder flow path is oriented so that gravity assists powder flowing through said portion of said tube.

9. The apparatus of claim 8 wherein said portion of said powder flow path is vertically oriented.

10. The apparatus of claim 5, wherein said light detector produces said output signal as a voltage signal, said circuit determining an RMS value of said voltage signal.

11. The apparatus of claim 10, wherein said light detector output signal is pulsed and said circuit determines RMS value of said output signal of said light detector including a no flow RMS value when powder is not flowing through said portion of said powder flow path, said circuit determining that powder is flowing through said portion of said powder flow path when an RMS value of said output signal of said light detector is different from said no flow RMS value.

12. The apparatus of claim 11, wherein said circuit determines said no flow RMS value based on a maximum signal produced by said light detector when no powder is flowing through said portion of said powder flow path, so that powder flowing through said portion of said powder flow path reduces intensity of light received by said light detector and reduces an RMS value of said output signal to indicate powder is flowing through said portion of said tube.

13. The apparatus of claim 5, wherein said light detector output signal is pulsed and said circuit determines a first RMS value of said output signal of said light detector for a first powder flow rate through said portion of said powder flow path and determines that flow rate has changed when a second RMS value of said output signal from said light detector is different from said first RMS value by a selected amount.

14. The apparatus of claim 5 wherein said portion of said powder flow path has a sufficient length to diameter ratio so that any powder that may collect at a boundary layer of said portion of said powder flow path does not affect light that is transmitted into said portion of said powder flow path by said light source that would otherwise be received by said light detector.

15. The apparatus of claim 1 wherein said circuit generates an alarm when said circuit determines that powder is not flowing through said powder flow path.

16. The apparatus of claim 15 wherein said alarm comprises a visual alarm or an audible alarm or both.

17. A method for detecting pulsed powder flow in a powder flow path, the method comprising:
pumping powder through the powder flow path using a powder pump comprising a pump chamber,
drawing powder into an inlet of said pump chamber using negative pressure applied to said pump chamber and pushing powder out of an outlet of said pump chamber into the powder flow path when positive pressure is applied to said pump chamber so that powder will flow in pulses from said pump chamber into the powder flow path during operation of said powder pump,
using a first valve to control flow of powder into said pump chamber and using a second valve to control flow of powder out of said pump chamber,
sensing a flow characteristic of powder flowing through said powder flow path,
producing an output signal based on said flow characteristic, and
determining from said output signal whether powder is flowing through said powder flow path.

18. The method of claim 17 wherein sensing the flow characteristic of the powder flowing through said powder flow path comprises transmitting electromagnetic energy into said powder flow path and detecting electromagnetic energy that passes through said powder flow path.

19. An apparatus for detecting pulsed powder flow in a tube, the apparatus comprising:
a powder pump comprising a pump inlet and a pump outlet, said powder pump comprising a pump chamber wherein powder is drawn into said pump chamber, via the pump inlet, by negative pressure applied to said pump chamber and powder is pushed out of said pump chamber to said pump outlet when positive pressure is applied to said pump chamber, said powder flowing in pulses from said pump outlet into a powder flow path,
a light source, and
a light detector for detecting light from said light source when said light source produces light that passes into a portion of said powder flow path,
said light detector producing a pulsed output signal in response to intensity of light from said light source that passes through said portion of said powder flow path as powder flows in pulses from said pump outlet through said powder flow path,
a circuit that receives said light detector pulsed output signal and determines whether powder is flowing through said portion of said tube based on an average intensity of said light that passes through said portion of said powder flow path.

20. The apparatus of claim 19 wherein said light source, said light detector and a transparent portion of said powder flow path are disposed in a housing, and said housing is connectable to said powder pump.

21. The apparatus of claim 20 wherein said housing is connected to said powder pump at or near said pump outlet.

22. The apparatus of claim 20 wherein said powder pump comprises a connector tube that provides a portion of said powder flow path from said pump outlet into said housing.

23. The apparatus of claim 20 wherein said powder pump comprises an outlet member and said housing comprises a connection member to connect said housing to said outlet member.

24. The apparatus of claim 23 wherein said connection member and said outlet member are threadably connectable together.

25. The apparatus of claim 24 wherein said housing comprises a second threaded connection member that mates with a threaded connector that receives a first end of a feed hose, said feed hose having a second end that is connectable to an end use such as a spray gun or receptacle.

26. The apparatus of claim 19 wherein said light source, said light detector and a transparent portion of said powder flow path are disposed in a housing, said housing is connectable to said powder pump, and said housing is connectable in-line between said pump outlet and a feed hose that is connectable to an end use such as a spray gun or receptacle.

27. The apparatus of claim 19 wherein, when said powder pump has previously been placed in service without said light source and said light detector, said light source, said light detector and a transparent portion of said powder flow path are disposed in a housing that is connectable as an add-on feature to said powder pump.

28. The apparatus of claim 19 wherein said powder pump comprises a pump inlet, an inlet pinch valve that controls the flow of powder into said pump inlet, and an outlet pinch valve that controls the flow of powder out of said pump outlet.

29. An apparatus for detecting pulsed powder flow in a tube, the apparatus comprising:
a powder pump comprising a pump inlet and a pump outlet, said powder pump comprising a pump chamber wherein powder is drawn into said pump chamber, via the pump inlet, by negative pressure applied to said pump chamber and powder is pushed out of said pump chamber to said pump outlet when positive pressure is applied to said pump chamber, said powder flowing in pulses from said pump outlet into a powder flow path,
a light source, and
a light detector for detecting light from said light source when said light source produces light that passes into a portion of said powder flow path,
said light detector producing a pulsed output signal in response to intensity of light from said light source that passes through said portion of said powder flow path as powder flows in pulses from said pump outlet through said powder flow path,
wherein said light source, said light detector and a transparent portion of said powder flow path are disposed in a housing that is connectable to said powder pump.

30. The apparatus of claim 29 wherein said housing is connected to said powder pump at or near said pump outlet.

31. The apparatus of claim 29 wherein said powder pump comprises a connector tube that provides a portion of said powder flow path from said pump outlet into said housing.

32. The apparatus of claim 29 wherein said powder pump comprises an outlet member and said housing comprises a connection member to connect said housing to said outlet member.

33. The apparatus of claim 32 wherein said connection member and said outlet member are threadably connectable together.

34. The apparatus of claim 33 wherein said housing comprises a second threaded connection member that mates with a threaded connector that receives a first end of a feed hose, said feed hose having a second end that is connectable to an end use such as a spray gun or receptacle.

35. The apparatus of claim 29 wherein said housing is connectable in-line between said pump outlet and a feed hose that is connectable to an end use such as a spray gun or receptacle.

36. The apparatus of claim 29 wherein, when said powder pump has previously been placed in service without said light source and said light detector, said housing is connectable as an add-on feature to said powder pump.

37. The apparatus of claim 29 wherein said powder pump comprises a pump inlet, an inlet pinch valve that controls the flow of powder into said pump inlet, and an outlet pinch valve that controls the flow of powder out of said pump outlet.

38. An apparatus for detecting pulsed powder flow in a tube, the apparatus comprising:
a powder pump comprising a pump inlet and a pump outlet, said powder pump comprising a pump chamber wherein powder is drawn into said pump chamber, via the pump inlet, by negative pressure applied to said pump chamber and powder is pushed out of said pump chamber to said pump outlet when positive pressure is applied to said pump chamber, said powder flowing in pulses from said pump outlet into a powder flow path,
a light source, and
a light detector for detecting light from said light source when said light source produces light that passes into a portion of said powder flow path,
said light detector producing a pulsed output signal in response to intensity of light from said light source that passes through said portion of said powder flow path as powder flows in pulses from said pump outlet through said powder flow path,
wherein, when said powder pump has previously been placed in service without said light source and said light detector, said light source, said light detector and a transparent portion of said powder flow path are disposed in a housing that is connectable as an add-on feature to said powder pump.

39. The apparatus of claim 38 wherein said housing is connected to said powder pump at or near said pump outlet.

40. The apparatus of claim 38 wherein said powder pump comprises a connector tube that provides a portion of said powder flow path from said pump outlet into said housing.

41. The apparatus of claim 38 wherein said powder pump comprises an outlet member and said housing comprises a connection member to connect said housing to said outlet member.

42. The apparatus of claim 41 wherein said connection member and said outlet member are threadably connectable together.

43. The apparatus of claim 42 wherein said housing comprises a second threaded connection member that mates with a threaded connector that receives a first end of a feed hose, said feed hose having a second end that is connectable to an end use such as a spray gun or receptacle.

44. The apparatus of claim 38 wherein said housing is connectable in-line between said pump outlet and a feed hose that is connectable to an end use such as a spray gun or receptacle.

45. The apparatus of claim 38 wherein said powder pump comprises a pump inlet, an inlet pinch valve that controls the flow of powder into said pump inlet, and an outlet pinch valve that controls the flow of powder out of said pump outlet.

46. An apparatus for detecting pulsed powder flow from a pump for powder materials, the apparatus comprising:
a powder pump comprising a pump inlet and a pump outlet, an inlet pinch valve that controls the flow of powder into said pump inlet, and an outlet pinch valve that controls the flow of powder out of said pump outlet, a pump chamber wherein powder is drawn into said pump chamber through said inlet pinch valve, when said inlet pinch valve is open, by negative pressure applied to said pump chamber, and powder is pushed out of said pump chamber through said outlet pinch valve, when said outlet pinch valve is open, to said pump outlet when positive pressure is applied to said pump chamber, said powder flowing in pulses from said pump outlet into a powder flow path;
a powder flow detector positioned along said powder flow path; and
a circuit that receives an output signal from said powder flow detector and utilizes said output signal to determine whether powder is flowing through said pump outlet.

47. The apparatus of claim 46, wherein said powder flow detector comprises a light source that produces light into a portion of said powder flow path, and a light detector, said light detector producing a pulsed output signal in response to intensity of light from said light source that passes through said portion of said powder flow path as powder flows in pulses from said pump outlet through said powder flow path.

48. The apparatus of claim 47 wherein said light source, said light detector and a transparent portion of said powder flow path are disposed in a housing that is connectable to said powder pump.

49. The apparatus of claim 48 wherein said housing is connected to said powder pump at or near said pump outlet.

50. The apparatus of claim 48, wherein said housing is connectable in-line between said pump outlet and a feed hose that is connectable to a spray gun or receptacle.

* * * * *